G. S. SOWERS.
WAGON BOX RAIN COVER.
APPLICATION FILED AUG. 2, 1910.

1,031,206.  Patented July 2, 1912.

Inventor
George S. Sowers

Witnesses
J. Milton Jester
Charles W. Wilson

By Chas. A. Briscoe
Attorney

UNITED STATES PATENT OFFICE.

GEORGE S. SOWERS, OF SPRING HILL, KANSAS.

WAGON-BOX RAIN-COVER.

1,031,206.  Specification of Letters Patent.  Patented July 2, 1912.

Application filed August 2, 1910. Serial No. 575,186.

*To all whom it may concern:*

Be it known that I, GEORGE S. SOWERS, a citizen of the United States, residing at Spring Hill, in the county of Johnson and State of Kansas, have invented a new and useful Wagon-Box Rain-Cover, of which the following is a specification.

This invention relates to wagon covers and is designed to construct an emergency cover for open wagons, cars or the like wherein the contents of said wagon or vehicle may be protected from the dust, rain and other elements.

It is a further object of this invention to provide a seat for the wagon or vehicle constructed in such a manner that it is not necessary to move the seat in any manner whatsoever to place the cover upon the wagon.

Figure 1:
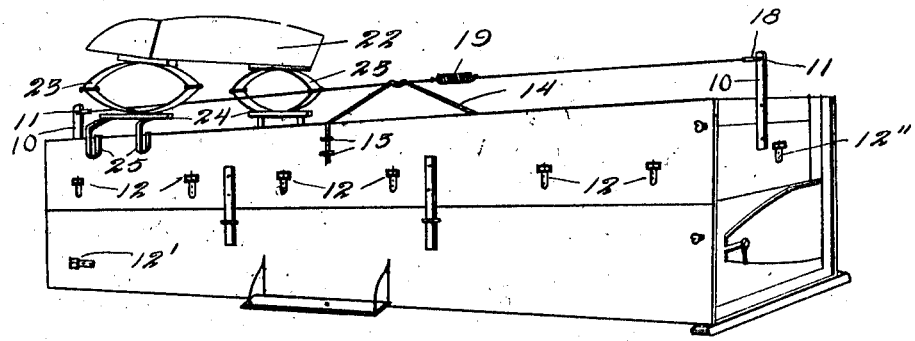
Figure 2:
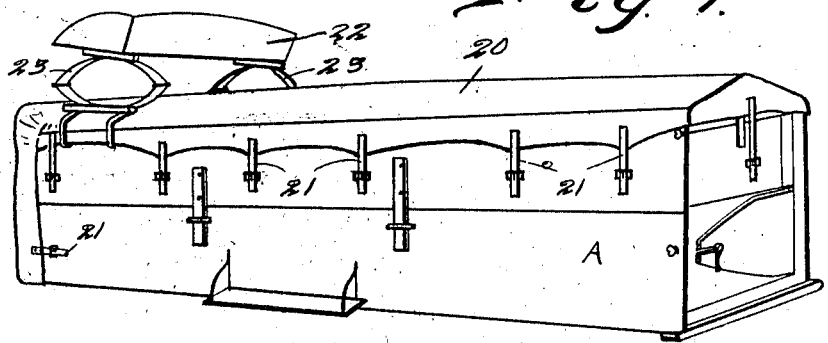
Figure 3:
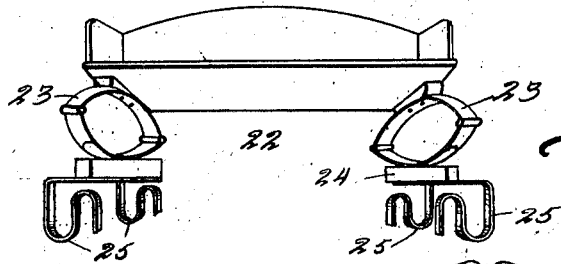
Figure 4:
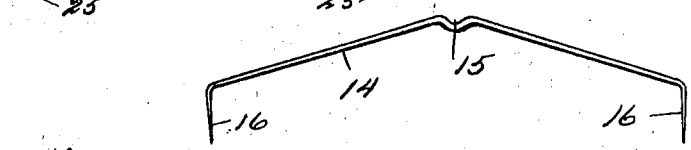
Figure 5:
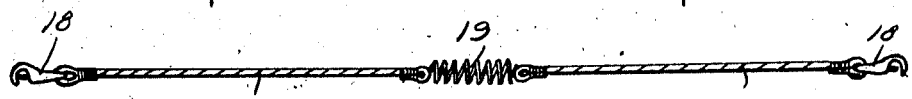

With the above and other objects in view, this invention consists in the construction, combination, and arrangement of parts, all as hereinafter more fully described, claimed and illustrated in the accompanying drawings, in which, Figure 1 is a perspective view of the wagon box illustrating the cover supporting elements previous to securing the cover thereto; Fig. 2 is a similar view illustrating the cover in its operative position; Fig. 3 is a perspective view of the particularly designed seat adapted to coöperate with the cover forming the subject matter of the present invention; Fig. 4 is a detailed view of the transverse centrally arranged supporting rod for the cover; Fig. 5 is an enlarged detailed elevation of the longitudinal central supporting member of the cover.

The cover forming the subject matter of the present invention comprises a transversely arranged supporting member adapted to span the wagon body and coöperating with the centrally disposed longitudinally extending member, said last named member being elevated above the side of the wagon body. The cover is adapted to rest upon these supporting members in such a manner that the same slopes to the sides to permit the thorough drainage of the same. The cover is rigidly secured to the wagon body by a series of buckles secured to said wagon body which coöperates with a series of straps carried along the edges of said cover.

Referring more particularly to the drawings, A indicates the body of the vehicle preferably a wagon built in accordance with the usual standard construction, the forward end thereof being a trifle higher than the rear end. A vertical rod 10 is centrally secured to each end gate of the body and extends above the horizontal plane of the sides thereof, said rods or bars having the eyes 11 piercing their upper terminals. A series of buckles 12 are attached to the sides of the body A and are adapted to secure the cover to said body as will be hereinafter more fully described, in detail. The buckles 12' extend along the forward vertical ends of the sides of the body A and form a fastening means for securing the cover over the forward end of the body, thereby preventing rain from entering the latter. The buckle 12'' is centrally secured to the rear end gate and forms a means for securing the rear end of the cover. In order to provide a means whereby said cover may be supported in such a manner that the same slopes toward the sides of the vehicle to permit the drainage thereof, a pair of eye bolts 13 is centrally secured to each side of the body A adjacent to the upper edge thereof, and an angularly bent bar 14 having the depression 15 centrally located adjacent to the bend thereof and the ends bent downwardly and tapered is secured in the eyes of the eye bolts 13 through the instrumentality of the downwardly bent tapered ends 16. A flexible member 17 is secured to the eye of each rod 11 by the snap hook 18, said flexible members connected by the helical coil spring 19, which provides for the constant tautness of said member. This member forms the longitudinal supporting member of the cover and is adapted to rest in the depression 15 of the transverse bar 14.

The cover 20 is adapted to rest upon the transverse member 14 and the longitudinal members 17 and be secured to the wagon by the straps 21, coöperating with the buckles 12, 12' and 12'', the coöperation of said straps and buckles producing a means for adjustment whereby the tautness of said cover may be easily regulated.

In order that the seat may in no way interfere with the placing of the cover upon the wagon and also in order to eliminate the removal of the seat when placing the cover on the wagon, a specially constructed attaching mechanism is provided for the same.

The seat indicated in general as 22 is of the usual construction having the ordinary elliptical springs 23 at each end thereof, said elliptical springs resting upon the bars 24. A double reversed U-shaped member 25 is carried by the under side of each bar 24, the inner bend of each member 25 being adapted to engage the sides of the wagon permitting the cover to rest in the outer bend of the U of said members. Thus, it will be seen that the seat will in no way interfere with the operation of the cover.

Having thus fully described my invention, what I claim as new and desire to secure by Letters-Patent is:

1. The combination with a wagon body, of eye bolts centrally carried by the sides thereof, an upwardly sloping transversely arranged bar detachably carried in said eye bolts having a central depression therein, vertical supports carried by the end gates of said wagon body, a tensional longitudinal member detachably carried by said vertical supports and a cover adapted to coöperate with said supports.

2. The combination with a wagon body, of eye bolts centrally carried by the sides thereof, an upwardly sloping transversely arranged bar detachably carried in said eye bolts having a central depression therein, vertical supports carried by the end gates of said wagon body, a tensional longitudinal member detachably carried by said vertical supports, a cover adapted to coöperate with said supports, buckles carried by the sides of said body, straps carried by said cover coöperating with said buckles and an extension formed on said cover whereby the ends of said body may be covered.

GEO. S. SOWERS.

Witnesses:
M. B. SAMUEL,
W. M. ADAMS.